United States Patent

[11] 3,615,746

[72] Inventors Willard C. Brinegar
 Charlotte, N.C.;
 Joseph Di Pietro, Alma, Mich.
[21] Appl. No. 883,997
[22] Filed Dec. 10, 1969
[45] Patented Oct. 26, 1971
[73] Assignee Celanese Corporation
 New York, N.Y.
 Continuation-in-part of application Ser. No.
 562,119, July 1, 1966, now abandoned.

[54] FLAME-RETARDANT CELLULOSE TRIACETATE ARTICLES
 16 Claims, No Drawings
[52] U.S. Cl. .................................................. 106/15,
 106/177, 106/190, 106/196, 251/8.1
[51] Int. Cl. ........................................................ C08b 21/04
[50] Field of Search ............................................ 106/15 FP,
 177, 190; 252/8.1; 186/196

[56] References Cited
UNITED STATES PATENTS

| | | | |
|---|---|---|---|
| 2,574,515 | 11/1951 | Walter et al. .................. | 260/956 |
| 2,675,327 | 4/1954 | Gearhart ...................... | 106/176 |
| 2,858,228 | 10/1958 | Hughes........................ | 106/190 |
| 3,121,106 | 2/1964 | Nagy ........................... | 260/952 |

FOREIGN PATENTS

| | | | |
|---|---|---|---|
| 821,431 | 10/1959 | Great Britain................ | 106/196 |

Primary Examiner—Lorenzo B. Hayes
Attorneys—Thomas J. Morgan, Stephen D. Murphy and Andrew F. Sayko, Jr.

ABSTRACT: A composition and solution for forming shaped articles comprising cellulose acetate, from 1 to 20 percent of a bromo-aliphatic phosphate containing from 10 to 30 percent bromine and from 0.4 to 3 percent of a second compound selected from the group consisting of phenyl phosphates, cresyl phosphates, di(t-butyl) peroxide, dicumyl peroxide, and 2,5-dimethyl-2,5-di(t-butyl-5-peroxy) hexane.

FLAME-RETARDANT CELLULOSE TRIACETATE ARTICLES

This invention is a continuation-in-part of U.S. application Ser. No. 562,119 filed July 1, 1966 now abandoned.

This invention relates to improved self-extinguishing cellulose triacetate articles, and a process of producing them.

Cellulose triacetate has found wide commercial acceptance as manmade fibers for textiles, nonwoven products and the like. While these products are for the most part suitable in the end-use applications for which they are utilized, there are uses for which increased flame retardance would be very desirable. Such uses are wearing apparel and household furnishings, such as draperies, and upholstery fabrics.

It is an object of this invention to provide shaped articles of cellulose triacetate having increased flameproofing.

It is a further object of this invention to provide low-denier fiber products of cellulose triacetate which do not support combustion when contacted with a flame after the flame is removed.

It is a still further object of this invention to impart self-extinguishing properties to shaped articles of cellulose triacetate without serious sacrifice of their other favorable properties such as mechanical and dyeing properties.

In accordance with this invention, there is incorporated into an organic solvent solution of cellulose triacetate a minor amount of a bromo-aliphatic phosphate and a minor amount of a second additive compound selected from the group consisting of phenyl phosphates, cresyl phosphates, di(t-butyl) peroxide, dicumyl peroxide and 2,5-dimethyl-2,5-di(t-butyl-5-peroxy) hexane. The contemplated phenyl and cresyl phosphates are preferably unsubstituted phosphates having three phenyl or three cresyl groups, e.g. triphenyl phosphate, o-phenylphenyl bis-phenyl phosphate, tricresyl phosphate or tris-o-phenylphenyl phosphate.

The organic solvent solutions of cellulose triacetate to which this invention may be applied are conventional spinning or casting solutions for the production of filaments and films respectively which generally contain about 10 to 30 percent by weight of cellulose triacetate. The solvent used is preferably methylene chloride but other solvents may be used such as ethylene chloride.

THe bromo-aliphatic phosphate may contain open and/or cyclic aliphatic groups and may be a bromine-substituted alkyl or cycloalkyl phosphate in which the substituted alkyl groups contain 3 to 8 carbon atoms. The bromine content of the bromo-aliphatic phosphate is preferably about 10 to 30 percent by weight. Some specific compounds which may be used are tris(2,3-dibromo-propyl) phosphate, which is preferred, tris(2,-bromobutyl) phosphate, tris(bromohexyl) phosphate, and tris(bromocyclohexyl) phosphate.

THe bromo-aliphatic phosphate is used in the solution of cellulose triacetate in an amount of at least 1 percent, preferably 1 to 20 percent, and most preferably in an amount of 5 to 10 percent by weight of the cellulose triacetate, whereas the second additive compound is used in an amount of 0.4 to 3 percent, preferably 0.4 to 1 percent based on the weight of cellulose triacetate.

The total amount of additives used is less than the amount of bromo-aliphatic phosphate or second additive compound which would be necessary to produce an equivalent fire-retardant effect in a shaped article (e.g., fiber or film) of cellulose triacetate, when used alone.

As is well known in the art, cellulose triacetate is a cellulose acetate containing at least 59 percent preferably at least 61 percent by weight of acetyl group calculated as combined acetic acid. Thus, cellulose triacetate may be distinguished from secondary cellulose acetate which generally contains about 54 to 56 percent of acetyl groups calculated as combined acetic acid.

In addition to the flameproofing agents of this invention, the organic solvent solution of cellulose triacetate may contain other modifying components, e.g., pigments for dulling or coloring the yarn or film, plasticizers, stabilizers, etc.

The following examples further illustrate the invention:

EXAMPLE I

In a spinning solution of 20 weight percent of cellulose triacetate having an acetyl value of about 61.5 percent calculated as combined acetic acid in a solvent composed of 91 percent methylene chloride and 9 percent methanol were dissolved 5 percent based on the weight of cellulose triacetate of tris(2,3-dibromopropyl) phosphate and 1 percent based on the weight of cellulose triacetate of o-phenyl-phenyl bisphenyl phosphate. This modified spinning solution was extruded in a downward direction through a spinnerette containing 40 holes each 36 microns in diameter into a spinning column of 7 inches in diameter and 7 feet long containing air traveling in an upward direction. The temperature of the spinnerette face was 80° C. and the average air temperature in the spinning column was 50° C. The takeup speed of the resulting yarn was 100 meters per minute.

THe resulting cellulose triacetate yarn had a total denier of 143, a tendency of 1.33 grams per denier, an elongation of 24.0 percent and was self-extinguishing when subjected to the flame test described below.

EXAMPLE II

THe procedure of example I was repeated except that tricresyl phosphate was used in place of O-phenylphenyl bisphenyl phosphate in an amount of 1 percent based on the weight of the cellulose triacetate.

The resulting yarn had a total denier of 75, a tenacity of 1.10 grams per denier, an elongation of 27.5 percent and was self-extinguishing when subjected to the flame test described below.

EXAMPLE III

The procedure of example I was repeated except that the o-phenylphenyl bisphenyl phosphate was replaced by 1 percent based on the weight of cellulose triacetate of di-t-butyl peroxide.

The resulting yarn had a total denier of 160, a tenacity of 135 grams/denier, an elongation of 26.2 was self-extinguishing using the flame test described below.

EXAMPLES IV and V

The procedure of example I is repeated except that the o-phenylphenyl bisphenyl phosphate is replaced by 1 percent based on the weight of cellulose triacetate of dicumyl peroxide (example IV) and 2,5-dimethyl-2,5-di(t-butyl-5-peroxy) hexane (example V).

Satisfactory self-extinguishing yarns are obtained which are self-extinguishing when subjected to the flame test described below. The flame test of the yarn products described in examples I to V was carried out as follows:

The yarn was knitted into a hose leg, a 6 to 8 inch section of which was suspended vertically from a support placed in an area essentially free from direct air drafts. The freely hanging lower edge of the fabric was ignited with a luminous flame from either a Bunsen burner or a paper safety match. After the initial ignition of the fabric, the flame was removed and the burning characteristics of the fabric were observed. The sample was considered to be self-extinguishing if the flame was repeatedly extinguished after several ignitions of the same fabric sample.

Although the foregoing disclosure of the invention primarily described fibers as shaped articles, the compositions of the invention may also be used to form flame-retardant films and molded articles. Thus, the organic solvent solution of cellulose triacetate and additives may be cast into films or precipitated to form flake which may subsequently be injection- or compression-molded.

EXAMPLE VI

In a casting solution of 10 weight percent of cellulose triacetate having an acetyl value of about 61.5 percent calculated as combined acetic acid in a solvent composed of 91 percent methylene chloride and 9 percent methanol was dissolved 1 percent based on the weight of cellulose triacetate of tris(2,3-dibromopropyl) phosphate and 0.2 percent based on the weight of cellulose triacetate of o-phenylphenyl-bis-phenyl phosphate. This casting solution was tumbled at room temperature until the dope appeared uniform. The film was cast onto a glass plate utilizing a doctor blade having a 6⅛ inch by 0.02 inch Gardener Knife. The film was dried in a steam oven until free from all solvents. The resulting film was self-extinguishing when subjected to the flame test described below.

EXAMPLES VII, VIII, IX, X and XI

The procedure of example VI was repeated except that the following additives were added to the casting solution in place of 1 percent tris(2,3-dibromopropyl) phosphate and 0.2 percent o-phenylphenyl bisphenyl phosphate:

Additives to CTA solution in methylene chloride/methanol

| | |
|---|---|
| Example VII | 2% tris(2,3-dibromopropyl) phosphate |
| Example VIII | 1% tris(2,3-dibromopropyl) phosphate and 0.4% o-phenyl-phenyl bisphenyl phosphate |
| Example IX | 1% tris(2,3-dibromopropyl) phosphate and 0.4% tris-o-phenylphenyl phosphate |
| Example X | % tris(2,3-dibromopropyl) phosphate and 0.4% tricresyl phosphate |
| Example XI | 1 tris(2,3-dibromopropyl) phosphate and 0.4% triphenyl phosphate |

The film of example VII burned when subjected to the flame test described below. The films of examples VIII, IX, X and XI were self-extinguishing when subjected to the flame test described below.

The flame test for the films described in examples VII to XI was carried out as follows:

The film was cut into three 3 inch by 6 inch strips held rigid in a metal U-frame. The rigid strips were held vertically and ignited with a Bunsen burner. After the initial ignition of the film, the flame was removed and the burning characteristics of the film were observed. The sample was considered to be self-extinguishing if the flame was repeatedly extinguished after several ignitions of the same film sample.

It is to be understood that the foregoing detailed description is given merely by way of illustration and that many variations may be made therein without departing from the spirit of our invention.

The embodiments of the invention in which an exclusive property or privilege is claimed are defined as follows:

1. A composition comprising cellulose triacetate having an acetyl value of at least 59 percent by weight calculated as combined acetic acid, and a flame-retardant amount of a synergistic flame-retardant mixture comprising from 1 percent to 20 percent by weight based on the weight of the cellulose triacetate of a bromo-aliphatic phosphate containing about 10 percent to 30 percent by weight of bromine, said bromo-aliphatic phosphate selected from the group consisting of bromine-substituted alkyl and cycloalkyl phosphates wherein said alkyl group contains from 3 to 8 carbon atoms and from 0.4 percent to 3 by weight based on the weight of the cellulose triacetate of a second additive compound selected from the group consisting of phenyl phosphates, cresyl phosphates, di(t-butyl) peroxide, dicumyl peroxide, and 2,5-dimethyl-2,5-di(t-butyl-5-peroxy) hexane.

2. The composition of claim 1 in the form of a shaped article.

3. The product of claim 2 wherein said shaped article is a fiber.

4. The product of claim 2 wherein said shaped article is a film.

5. The product of claim 1 wherein said bromo-aliphatic compound is tris(2,3-dibromopropyl) phosphate and said second additive compound is o-phenylphenyl bisphenyl phosphate.

6. The product of claim 1 wherein said bromo-aliphatic phosphate is tris(2,3-dibromopropyl) phosphate and said second additive compound is tricresyl phosphate.

7. The composition of claim 1 containing from 5 to 10 percent by weight of said bromo-aliphatic phosphate and from 0.4 to 1 percent by weight of said second additive compound.

8. A solution of cellulose triacetate having an acetyl value of at least 59 percent calculated as combined acetic acid suitable for forming into shaped articles containing from 1 percent to 20 percent by weight based on the weight of cellulose triacetate of bromo-aliphatic phosphate containing about 10 to 30 percent by weight of bromine, said bromo-aliphatic phosphate selected from the group consisting of bromine-substituted alkyl and cycloalkyl phosphates wherein said alkyl group contains from 3 to 8 carbon atoms and from 0.4 to 1 percent by weight based on the weight of cellulose triacetate of a second additive compound selected from the group consisting of phenyl phosphates, cresyl phosphates, di(t-butyl) peroxide, dicumyl peroxide, and 2,5-dimethyl-2,5-di(t-butyl-5-peroxy) hexane.

9. The solution of claim 8 wherein the solvent is principally composed of methylene chloride, said bromo-aliphatic phosphate is tris(2,3-dibromopropyl) phosphate and said second additive compound is a phenyl phosphate.

10. THe solution of claim 8 wherein the solvent is principally composed of methylene chloride, said bromo-aliphatic phosphate is tris(2,3-dibromopropyl) phosphate and said second additive compound is a cresyl phosphate.

11. The composition of claim 8 containing from 5 to 10 percent by weight of said bromo-aliphatic phosphate and from 0.4 to 1 percent by weight of said second additive compound.

12. A process for forming a shaped article comprising dissolving in a solvent cellulose triacetate having an acetyl value of at least 59 by weight calculated as combined acetic acid, from 1 to 20 percent by weight based on the weight of cellulose triacetate of tris(2,3-dibromopropyl) phosphate and from 0.4 to 1 percent by weight based on the weight of cellulose triacetate of a second additive compound selected from the group consisting of phenyl phosphates, cresyl phosphates, di(t-butyl) peroxide, dicumyl peroxide, and 2,5-dimethyl-2,5-di(t-butyl-5-peroxy) hexane.

13. The process of claim 12 wherein said solvent is principally composed of methylene chloride, said second additive compound is o-phenylphenyl bisphenyl phosphate, and said shaped article is a filament.

14. The process of claim 12 wherein said solvent is principally composed of methylene chloride, said second additive compound is tricresyl phosphate, and said shaped article is a filament.

15. The process of claim 12 wherein from 5 to 10 percent by weight of said phosphate is dissolved in said solvent.

16. A film comprising cellulose triacetate having an acetyl value of at least 59 percent by weight calculated as combined acetic acid, and a flame-retardant amount of a synergistic flame retardant mixture comprising from 1 to 20 percent by weight based on the weight of the cellulose triacetate of a bromo-aliphatic phosphate containing about 10 to 30 percent by weight of bromine, said bromo-aliphatic phosphate selected from the group consisting of bromine-substituted alkyl and cycloalkyl phosphates wherein said alkyl group contains from 3 to 8 carbon atoms and from 0.2 to 3 percent by weight based on the weight of cellulose triacetate of a second additive compound selected from the group consisting of phenyl phosphates, cresyl phosphates, di(t-butyl) peroxide, dicumyl peroxide, and 2,5-dimethyl2,5-di(t-butyl-5 -peroxy) hexane.

PO-1050
(5/69)

UNITED STATES PATENT OFFICE
CERTIFICATE OF CORRECTION

Patent No. 3,615,746                     Dated  October 26, 1971

Inventor(s) Willard C. Brinegar, Joseph DiPietro

It is certified that error appears in the above-identified patent and that said Letters Patent are hereby corrected as shown below:

Column 2, line 19, "tendency" should be ---tenacity---
Column 3, Example X, "%" should be ---1%---
Column 3, Example XI, "1" should be ---1%---
Column 3, line 65, claim 1, "3" should be ---3 percent---
Column 4, claim 12, "59" should be ---59 percent ---

Signed and sealed this 23rd day of May 1972.

(SEAL)
Attest:

EDWARD M. FLETCHER, JR.          ROBERT GOTTSCHALK
Attesting Officer                Commissioner of Patents